Aug. 19, 1969  J. T. FRYER  3,461,999

AGRICULTURAL IMPLEMENTS

Filed April 11, 1967  2 Sheets-Sheet 1

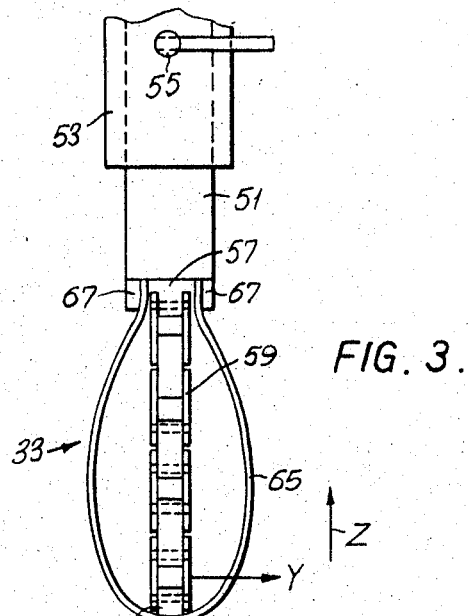
FIG. 3.
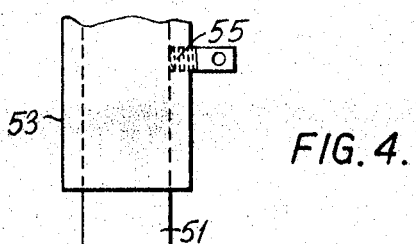
FIG. 4.
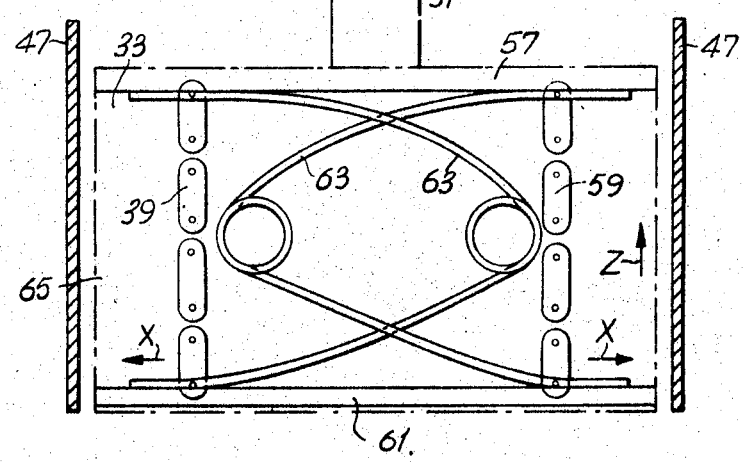

United States Patent Office 3,461,999
Patented Aug. 19, 1969

3,461,999
AGRICULTURAL IMPLEMENTS
John Tim Fryer, Silsoe, England, assignor to National Research Development Corporation, London, England, a British corporation
Filed Apr. 11, 1967, Ser. No. 630,065
Claims priority, application Great Britain, Apr. 18, 1966, 16,827/66
Int. Cl. B65g 65/06, 15/00, 17/00
U.S. Cl. 198—9          9 Claims

ABSTRACT OF THE DISCLOSURE

This application discloses a paddle wheel arranged to feed articles onto a conveyor and having paddles which are rigid circumferentially of the paddle wheel but can flex radially in order that articles trapped by the paddles shall not be damaged.

---

This invention relates to improvements in agricultural implements and is concerned with devices for feeding harvested crops onto a conveyor.

In the mechanised harvesting of field crops, it is possible to use two power driven rotary circular disc-like shares set with their planes at an obtuse angle to one another and having serrated peripheries to sever the stalks of the crop, say the stalk of a cabbage, the cabbage being lifted by a conveyor.

To ensure that the cut cabbages are in fact properly fed to the conveyor, a paddle wheel preferably should be provided, rotating about a horizontal axis which extends transversely to the direction of movement of the conveyor, and the paddles of which engage the cabbages and sweep them in turn onto the conveyor. However when such a paddle fails to engage a cabbage properly, it can descend onto the cabbage and squeeze it against the earth, so damaging the cabbage.

According to the present invention, a paddle wheel arranged to feed articles onto a conveyor includes a plurality of paddles each of which includes an article-engaging pusher member which is rigid in its direction of travel as the paddle wheel rotates, but is flexible in a radial direction, whereby in use if one of the articles is trapped under one of the pusher members, that pusher member flexes radially to avoid damaging the trapped article.

The invention will now be described, by way of example, with reference to the accompanying drawings, in which:

FIGURE 3 is a side elevation of a pusher member of a paddle wheel shown in FIGURE 2, but drawn to a much larger scale than in that figure;

FIGURE 4 is a front view of the pusher member shown in FIGURE 3; and

Figure 1:
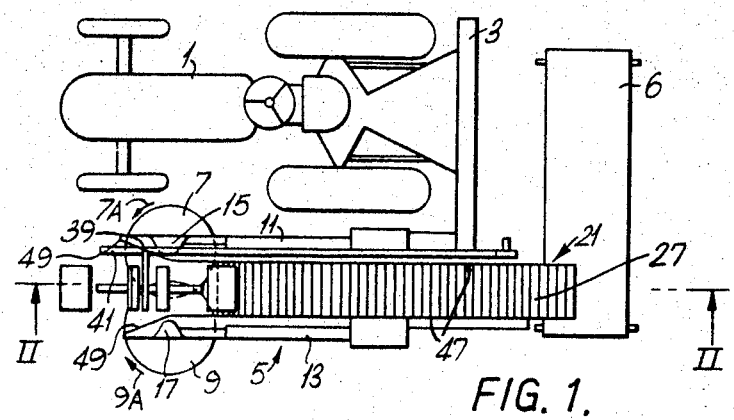
FIGURE 1 is a diagrammatic plan view of a tractor and of a cabbage harvesting device carried by and positioned to one side of that tractor.
Figure 2:
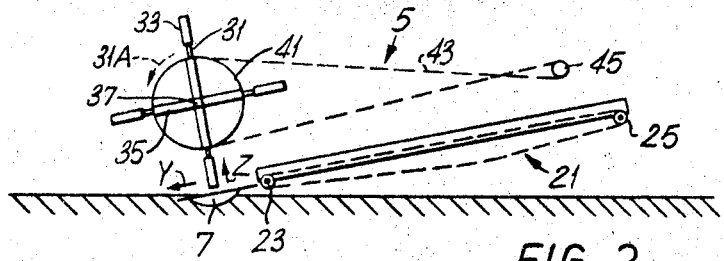
FIGURE 2 is a sectional side elevation taken on the line II—II of FIGURE 1 and showing the essential parts only of the harvesting device.

Referring first to FIGURE 1, the tractor 1 is connected by a framework 3 to the cabbage harvesting device 5 which travels by the side of the tractor and discharges onto a conveyor 6 which loads the crop into containers or vehicles running alongside the tractor. The harvesting device includes two overlapping disc-like rotors 7 and 9, the axes of rotation of which lie in a plane which extends transversely of the tractor and is inclined upwardly and forwardly. These two axes converge upwardly in that plane at an angle of 40°, so that the plane of the two rotors are inclined to one another at an included angle of 140°. The peripheral edges of these two rotors are serrated and since they overlap, the discs are effective as they are power driven to sever the stalks of cabbages which enter the space between the leading parts of the discs.

The power take-off of the tractor, which is a standard fitting, is coupled through suitable shafting to two drive shafts extending forwardly of the harvesting device and enclosed respectively in housings 11 and 13. At their forward ends, these two shafts are coupled through gear boxes 15 and 17 respectively to the two rotors 7 and 9 which are thus driven so that they rotate in the directions indicated by the arrows 7A and 9A respectively. Extending at a rearward and upward inclination from the rear ends of the rotors 7 and 9 is an endless conveyor 21 consisting of two endless side chains carried by front idler sprockets 23 and rear driving sprockets 25, these latter sprockets being driven from the tractor power take-off, and a multiplicity of cross bars 27, the cross bars being attached to the side chains to form a slatted conveyor.

It will be seen that when the tractor 1 is driven along one side of a row of cabbages, at a suitable distance from the row, each cabbage stalk in turn will be severed by the rotors 7 and 9 and the rearward movement of the centre parts of these rotors 7 and 9 will tend to move the severed cabbage onto the cross bars 27 of the conveyor 21. In practice, this action is not sufficiently positive, and a paddle wheel 31 is provided, consisting of four paddles 33 mounted respectively on four evenly spaced radial arms 35 carried by a cross shaft 37 rotatably mounted in a bearing at 39 carried by the framework of the conveyor 21. The cross shaft also carriers a V-pulley 41 coupled by a crossed belt 43 to a driving V-pulley 45 power driven from the drive to the conveyor sprocket 25. The paddle wheel 31 is thus driven in the direction indicated by the arrow 31A at such a speed that the lowest paddle, during normal operation, is approximately stationary with respect to the ground.

The action of this power driven paddle wheel is to ensure that each cabbage after it is severed does reach the conveyor and that no cabbage remains on the rotors.

Each of the paddles 33 is of such width that is substantially fills (see FIGURE 4) the space between two fixed side guards 47 which extend rearwardly, from a location level with the axes of the two rotors 7 and 9, up the two sides of the conveyor 21. At their forward ends, these side guides are extended by forwardly divergent nose guides 49 (see FIGURE 1) which ensure that cabbages are guided laterally towards the centre of the conveyor.

FIGURES 3 and 4 illustrate the construction of the paddle 33. Each paddle is mounted on a rigid square section arm 51 which is slidably fitted into a rigid hollow socket 53 and is secured in a desired radial position by a clamping screw 55.

Welded to the arm 51 is a transverse oblong-section steel bar 57 to which is riveted one end of two short lengths of roller chain 59. Roller chain consists of outer side plates and inner links joined by rivets and has the property that although the chain can flex in planes parallel to those containing the side plates, it is comparatively rigid in the direction normal to those planes. Thus in the drawings the free ends of these lengths of chain 59 are able to move in the direction indicated by the arrows X but can move through only a very limited distance in the direction indicated by the arrow Y. The free ends of these chain lengths 59 are riveted to a transverse oblong-section steel bar 61 which is biassed away from the bar 57 by two steel hairpin springs 63.

Each of these springs has its free ends threaded through the spaces respectively between the bars 57 and 61 and the adjacent inner links of the chain lengths 59. The paddle is completed by a cover 65 of reinforced flexible plastics material (e.g. rubber suitably reinforced) which is clamped to the bar 57 by two bars 67.

It will be seen that by the action of the springs 63 each paddle 33 normally assumes the shape indicated in FIGURE 3 in which the two chain lengths 59 are fully extended. The paddle is then quite rigid in the direction Y. However, should a paddle in use descend on a cabbage, then the chain lengths 59 can flex, the springs 63 compressing somewhat, and the cover 65 flexing so that the cabbage is not damaged by the paddle.

Figure 5:
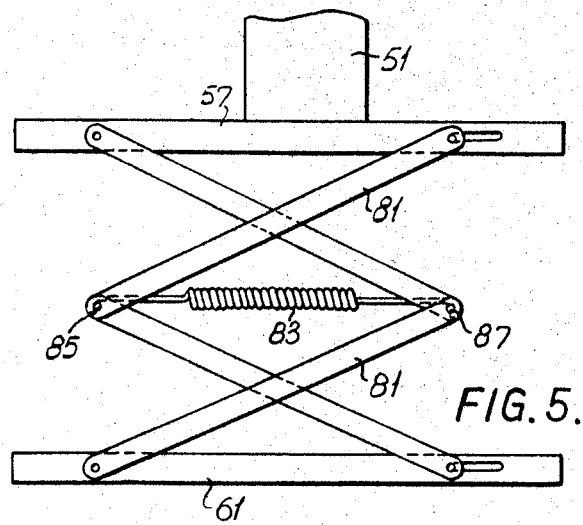
FIGURE 5 is a side elevation similar to FIGURE 4 but showing an alternative construction.

It will be appreciated that the form of paddle is illustrated by way of example only. In that example, the chain lengths provide rigidity in the direction Y and flexibility in the radial direction Z, while the springs 63 provide a biassing force in the outward Z direction. Other devices can be used to provide these requirements, such as the lazy-tongs arrangement shown in FIGURE 5 and consisting of flat links 81 with a spring 83 acting in the direction of the width of the paddle between pivot points 85 and 87 of the links. Other numerals in FIGURE 5 relate to parts corresponding to similar parts bearing the same numerals in FIGURE 3.

I claim:
1. Feeding means arranged to feed articles onto a conveyor and comprising: a paddle wheel provided with a plurality of radially extending paddles; each paddle including an article-engaging pusher member at the radially outer end thereof and forming the radially outer extremities of the paddle wheel; each pusher member comprising a flexible covering providing a working surface which in use engages the articles, and including supportng means disposed within the flexible covering for rendering the pusher member rigid as regards movement circumferentially of the paddle wheel, and for rendering the whole of the pusher member capable of flexing in a radial direction independently of each other pusher member such that the outer radially extremities of the paddle wheel are freely variable independently at different areas; whereby in use if one of the articles is trapped under one of the pusher members, the whole of that pusher member flexes radially to avoid damaging the trapped article.

2. Feeding means according to claim 1, in which the flexible covering is formed of a reinforced flexible plastics material.

3. Feeding means according to claim 1, in which:
   (a) the pusher member extends between a radially inner end a radially outer end;
   (b) the flexible covering is in the form of a strip of flexible material;
   (c) the strip is bent into a U-shape having two free ends;
   (d) clamping means are provided at the radially inner end of the pusher member; and
   (e) the two free ends are clamped to the clamping means.

4. Feeding means according to claim 1, in which the supporting means comprise:
   (a) a mechanical linkage which provides the specified rigidity against circumferential movement and flexibility in the radial direction; and
   (b) a separate device which biasses the mechanical linkage towards a radially outwards configuration corresponding to the normal unflexed operating condition of the pusher member.

5. Feeding means according to claim 4, in which the mechanical linkage is in the form of a lazy-tongs arrangement of flat links.

6. Feeding means according to claim 5, in which the specified separate device is in the form of a spring acting between two suitable points of the lazy-tongs arrangement.

7. Feeding means according to claim 4, in which the mechanical linkage is in the form of at least one length of roller chain consisting of outer side plates and inner links joined by rivets and having the property that although the chain can flex in planes parallel to those containing the side plates to provide the specified flexibility in the radial direction, the length of chain is comparatively rigid in the specified circumferential direction.

8. Feeding means according to claim 4, in which the specified separate device is in the form of a spring.

9. Feeding means according to claim 8, in which the pusher member has radially outer and inner parts, and the spring is in the form of a length of spring wire bent to provide end parts acting respectively on radially outer and radially inner parts of the pusher member and with a central turn or turns to provide an improved spring action.

References Cited
UNITED STATES PATENTS

| 882,715 | 3/1908 | Ratz | 56—227 |
|---|---|---|---|
| 1,085,161 | 1/1914 | Reip | 198—9 X |
| 1,687,685 | 10/1928 | Olinger | 198—9 X |

FOREIGN PATENTS

| 549,065 | 11/1922 | France. |
|---|---|---|
| 547,878 | 7/1929 | Germany. |
| 692,319 | 6/1940 | Germany. |

EDWARD A. SROKA, Primary Examiner

U.S. Cl. X.R.

198—167